(12) United States Patent
Swanson et al.

(10) Patent No.: US 12,744,057 B1
(45) Date of Patent: Sep. 22, 2026

(54) READ OFFSET CALIBRATION FOR MAGNETIC TAPE RECORDING

(71) Applicant: International Business Machines Corporation, Armonk, NY (US)

(72) Inventors: David Lee Swanson, Tucson, AZ (US); Ernest Stewart Gale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/221,352

(22) Filed: May 28, 2025

(51) Int. Cl.
*G11B 5/584* (2006.01)
*G11B 5/008* (2006.01)

(52) U.S. Cl.
CPC .......... *G11B 5/584* (2013.01); *G11B 5/00813* (2013.01)

(58) Field of Classification Search
None
See application file for complete search history.

(56) References Cited

U.S. PATENT DOCUMENTS 6,603,722 B1 * 8/2003 Taguchi ............. G11B 20/1833 369/59.21
6,839,196 B2 1/2005 Trivedi
8,824,083 B1 * 9/2014 Kientz ................... G11B 5/584 360/77.12
9,613,646 B2 4/2017 Ahmad et al.
2006/0056097 A1 * 3/2006 Hashimoto ............ G11B 5/455 360/75
2010/0020428 A1 * 1/2010 Mochizuki ......... G11B 5/59627
2010/0246043 A1 * 9/2010 Barsotti ........... G11B 20/10009
2012/0212846 A1 * 8/2012 Kientz ................... G11B 5/584
2014/0286385 A1 * 9/2014 Wilson ............. G11B 20/10046 375/232
2016/0189737 A1 * 6/2016 Poorman ................ G11B 5/584 360/77.12
2016/0254014 A1 * 9/2016 Biskeborn ........... G11B 5/4893 360/48
2016/0329069 A1 * 11/2016 Biskeborn .......... G11B 20/1202
2020/0166322 A1 * 5/2020 Judd .................... G11B 5/5508
2023/0067909 A1 * 3/2023 Wang .................. G11B 21/106

OTHER PUBLICATIONS

Schwarz, TA, "Re-Recordable Servo System for Multi-Track Tape," IBM, IP.com No. IPCOM000049798D, Jul. 1, 1982, 2 pages.

* cited by examiner

*Primary Examiner* — Peter Vincent Agustin
(74) *Attorney, Agent, or Firm* — Aaron N. Pontikos

(57) ABSTRACT

In one general embodiment, a method includes positioning a read transducer of a magnetic head at an initial position over a data track on a magnetic recording tape using servo information derived from servo reader signals. A reading characteristic is measured during reading of the data track. The position of the magnetic head relative to the data track is sequentially changed. The reading characteristic is measured during reading of the data track at the changed positions. Information derived from the measured reading characteristic and the positions of the magnetic head is assembled into a data set. The data set is processed to create a read offset corresponding to a final position approximately geometrically centered within the data track. The read offset is stored in a memory.

18 Claims, 16 Drawing Sheets

211
224
204A
218
204B
DIRECTION OF MEDIA TRAVEL
220
222
212
230
228
214
238
234
216
232
212
204B
236
226

READ OFFSET CALIBRATION FOR MAGNETIC TAPE RECORDING

BACKGROUND

The present invention relates to data storage systems, and more particularly, this invention relates to calibration of a magnetic tape drive for improving reading operations.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

A method, in accordance with one embodiment, includes positioning a read transducer of a magnetic head at an initial position over a data track on a magnetic recording tape using servo information derived from servo reader signals. A reading characteristic is measured during reading of the data track. The position of the magnetic head relative to the data track is sequentially changed. The reading characteristic is measured during reading of the data track at the changed positions. Information derived from the measured reading characteristic and the positions of the magnetic head is assembled into a data set. The data set is processed to create a read offset corresponding to a final position approximately geometrically centered within the data track. The read offset is stored in a memory.

An apparatus, in accordance with one embodiment, includes a drive mechanism for passing a magnetic recording tape over a magnetic head, and a controller electrically coupled to the magnetic head. The controller is configured to perform a method that includes positioning a read transducer of the magnetic head at an initial position over a data track on the magnetic recording tape using servo information derived from servo reader signals. A reading characteristic is measured during reading of the data track. The position of the magnetic head relative to the data track is sequentially changed. The reading characteristic is measured during reading of the data track at the changed positions. Information derived from the measured reading characteristic and the positions of the magnetic head is assembled into a data set. The data set is processed to create a read offset corresponding to a final position approximately geometrically centered within the data track. The read offset is stored in a memory.

A method for creating a reference tape, in accordance with one embodiment, includes receiving a primary magnetic recording tape. A first subprocess is performed using the primary magnetic recording tape. The first subprocess includes positioning a read transducer of the magnetic head at an initial position over a data track on the primary magnetic recording tape using second servo information derived from servo reader signals, measuring a reading characteristic during reading of the data track, sequentially changing a position of the magnetic head relative to the data track and measuring the reading characteristic during reading of the data track at the changed positions, assembling information derived from the measured reading characteristic and the positions of the magnetic head into a data set, and processing the data set to determine a first read offset corresponding to a position approximately geometrically centered within the data track. The primary magnetic recording tape is ejected. A reference magnetic recording tape is received. A second subprocess is performed using the reference magnetic recording tape. The second subprocess includes applying the first read offset, positioning the read transducer of the magnetic head at a second initial position over a second data track on the reference magnetic recording tape using second servo information derived from servo reader signals, measuring a second reading characteristic during reading of the second data track of the reference magnetic recording tape with the first read offset applied, sequentially changing the position of the magnetic head relative to the second data track of the reference magnetic recording tape and measuring the second reading characteristic during reading of the second data track at the changed positions, assembling second information derived from the measured second reading characteristic and the positions of the magnetic head into a second data set, and processing the second data set to determine a second read offset corresponding to a final position approximately geometrically centered within the second data track. The second read offset is stored in a memory of the reference magnetic recording tape.

Any of these embodiments may be implemented in a magnetic data storage system such as a tape drive apparatus, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
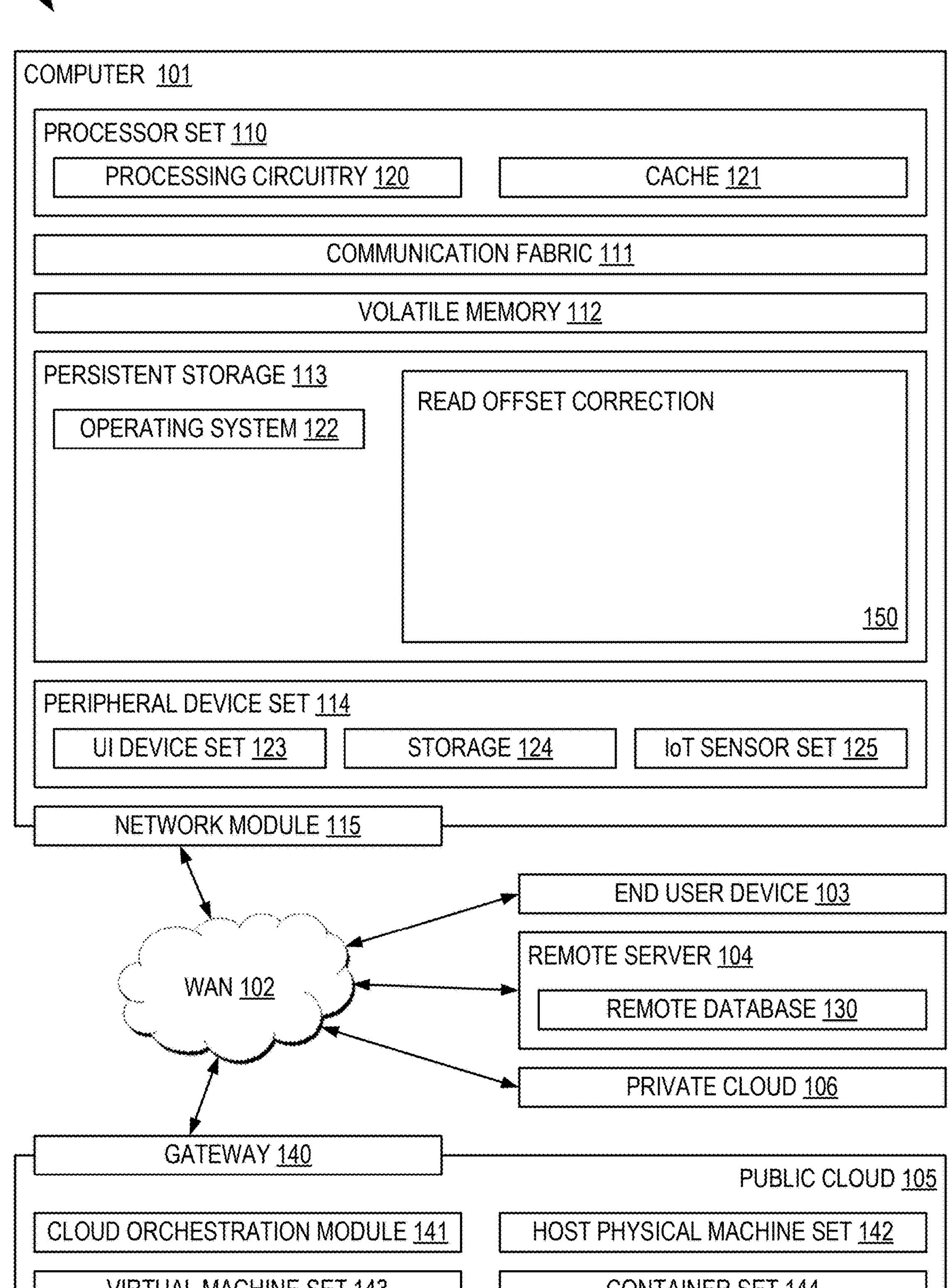
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes positioning a read transducer of a magnetic head at an initial position over a data track on a magnetic recording tape using servo information derived from servo reader signals. A reading characteristic is measured during reading of the data track. The position of the magnetic head relative to the data track is sequentially changed. The reading characteristic is measured during reading of the data track at the changed positions. Information derived from the measured reading characteristic and the positions of the magnetic head is assembled into a data set. The data set is processed to create a read offset corresponding to a final position approximately geometrically centered within the data track. The read offset is stored in a memory.

In another general embodiment, an apparatus includes a drive mechanism for passing a magnetic recording tape over a magnetic head, and a controller electrically coupled to the magnetic head. The controller is configured to perform a method that includes positioning a read transducer of a magnetic head at an initial position over a data track on a magnetic recording tape using servo information derived from servo reader signals. A reading characteristic is measured during reading of the data track. The position of the magnetic head relative to the data track is sequentially changed. The reading characteristic is measured during reading of the data track at the changed positions. Information derived from the measured reading characteristic and the positions of the magnetic head is assembled into a data set. The data set is processed to create a read offset corresponding to a final position approximately geometrically centered within the data track. The read offset is stored in a memory.

In another general embodiment, a method for creating a reference tape includes receiving a primary magnetic recording tape. A first subprocess is performed using the primary magnetic recording tape. The first subprocess includes positioning a read transducer of the magnetic head at an initial position over a data track on the primary magnetic recording tape using second servo information derived from servo reader signals, measuring a reading characteristic during reading of the data track, sequentially changing a position of the magnetic head relative to the data track and measuring the reading characteristic during reading of the data track at the changed positions, assembling information derived from the measured reading characteristic and the positions of the magnetic head into a data set, and processing the data set to determine a first read offset corresponding to a position approximately geometrically centered within the data track. The primary magnetic recording tape is ejected. A reference magnetic recording tape is received. A second subprocess is performed using the reference magnetic recording tape. The second subprocess includes applying the first read offset, positioning the read transducer of the magnetic head at a second initial position over a second data track on the reference magnetic recording tape using second servo information derived from servo reader signals, measuring a second reading characteristic during reading of the second data track of the reference magnetic recording tape with the first read offset applied, sequentially changing the position of the magnetic head relative to the second data track of the reference magnetic recording tape and measuring the second reading characteristic during reading of the second data track at the changed positions, assembling second information derived from the measured second reading characteristic and the positions of the magnetic head into a second data set, and processing the second data set to determine a second read offset corresponding to a final position approximately geometrically centered within the second data track. The second read offset is stored in a memory of the reference magnetic recording tape.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as read offset correction code stored in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2A:
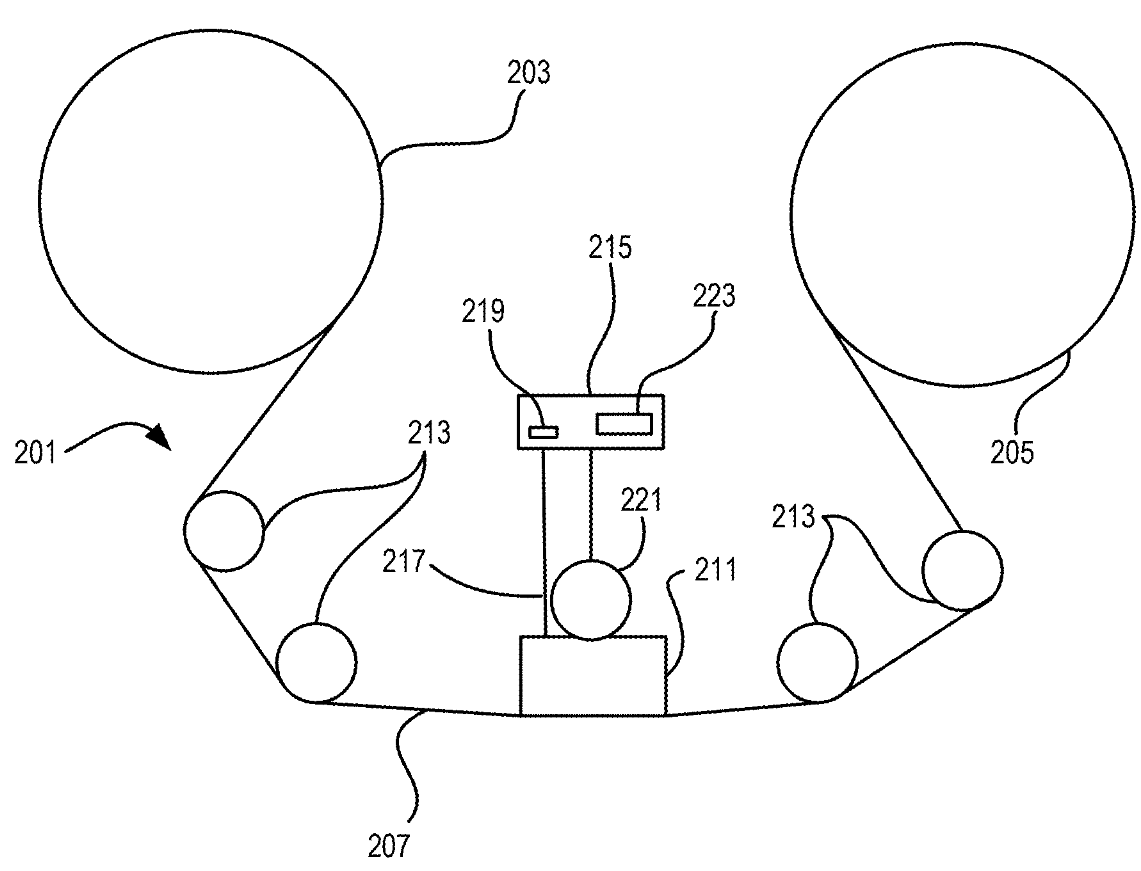
FIG. 2A is a schematic diagram of a simplified tape drive system, in accordance with one embodiment.

FIG. 2A illustrates a simplified tape drive 201 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 203 and a take-up reel 205 are provided to support a tape 207. One or more of the reels may form part of a removable cartridge and are not necessarily part of the tape drive 201. The tape drive, such as that illustrated in FIG. 2A, may further include drive motor(s) to drive the tape supply cartridge 203 and the take-up reel 205 to move the tape 207 over a tape head 211 of any type. Such head may include an array of read transducers (also referred to as readers and data readers), write transducers (also known in the art as writers), or both.

Guides 213 guide the tape 207 across the tape head 211. Such tape head 211 is in turn coupled to a controller 215 via a cable 217. The controller 215, may be or include a processor and/or any logic for controlling any subsystem of the drive 201. For example, the controller 215 typically controls head functions such as servo following, data writing, data reading, etc. The controller 215 may include at least one servo channel and at least one data channel, each of which include data flow processing logic configured to process and/or store information to be written to and/or read from the tape 207. The controller 215 may operate under logic known in the art, as well as any logic disclosed herein, and thus may be considered as a processor for any of the descriptions of tape drives included herein, in various embodiments. The controller 215 may be coupled to a memory 219 of any known type, which may store instructions executable by the controller 215. Moreover, the controller 215 may be configured and/or programmable to perform or control some or all of the methodology presented herein. Thus, the controller 215 may be considered to be configured to perform various operations by way of logic programmed into one or more chips, modules, and/or blocks; software, firmware, and/or other instructions being available to one or more processors; etc., and combinations thereof.

The cable 217 may include read/write circuits to transmit data to the tape head 211 to be recorded on the tape 207 and to receive data read by the tape head 211 from the tape 207. An actuator 221 controls position of the tape head 211 relative to the tape 207.

An interface 223 may also be provided for communication between the tape drive 201 and a host (internal or external) to send and receive the data and for controlling the operation of the tape drive 201 and communicating the status of the tape drive 201 to the host, all as will be understood by those of skill in the art.

Figure 2B:
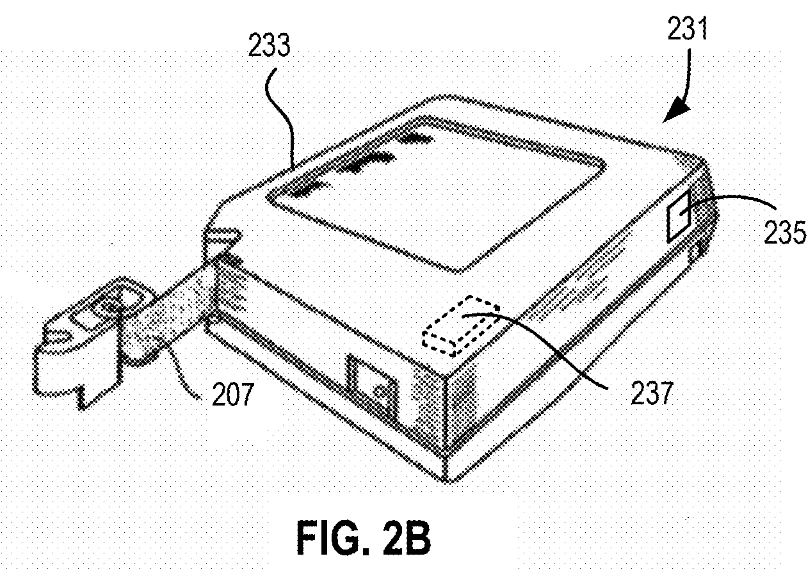
FIG. 2B is a schematic diagram of a tape cartridge, in accordance with one embodiment.

FIG. 2B illustrates an exemplary tape cartridge 231, according to one embodiment. Such tape cartridge 231 may be used with a system such as that shown in FIG. 2A. As shown, the tape cartridge 231 includes a housing 233, a tape 207 in the housing 233, and a nonvolatile memory 237 coupled to the housing 233. In some approaches, the nonvolatile memory 237 may be embedded inside the housing 233, as shown in FIG. 2B. In more approaches, the nonvolatile memory 237 may be attached to the inside or outside of the housing 233 without modification of the housing 233. For example, the nonvolatile memory may be embedded in a self-adhesive label 235. In one preferred embodiment, the nonvolatile memory 237 may be a Flash memory device, read-only memory (ROM) device, etc., embedded into or coupled to the inside or outside of the tape cartridge 231. The nonvolatile memory is accessible by the tape drive and the tape operating software (the driver software), and/or another device.

Figure 2C:
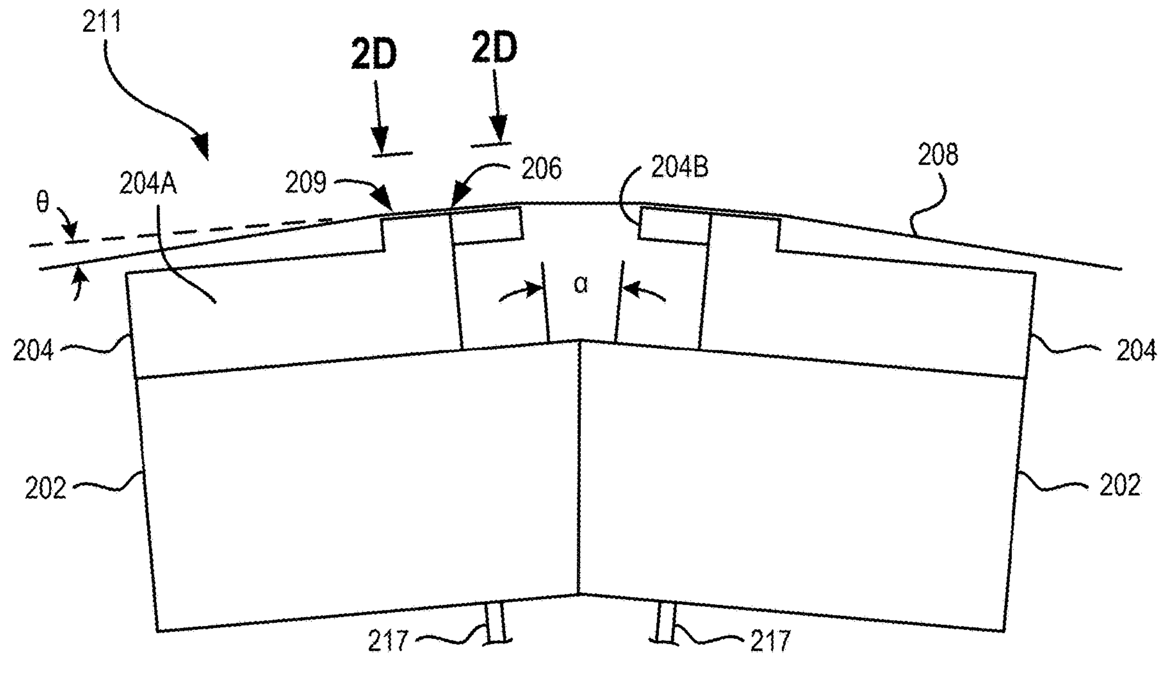
FIG. 2C illustrates a side view of a flat-lapped, bi-directional, two-module magnetic tape head, in accordance with one embodiment.

By way of example, FIG. 2C illustrates a side view of a flat-lapped, bi-directional, two-module magnetic tape head 211 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

Cables 217 are provided for enabling communication between the controller and the transducers 206 of each of the modules 204. Pads on a cable 217 are typically wire bonded to pads on the associated module 204.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2D:
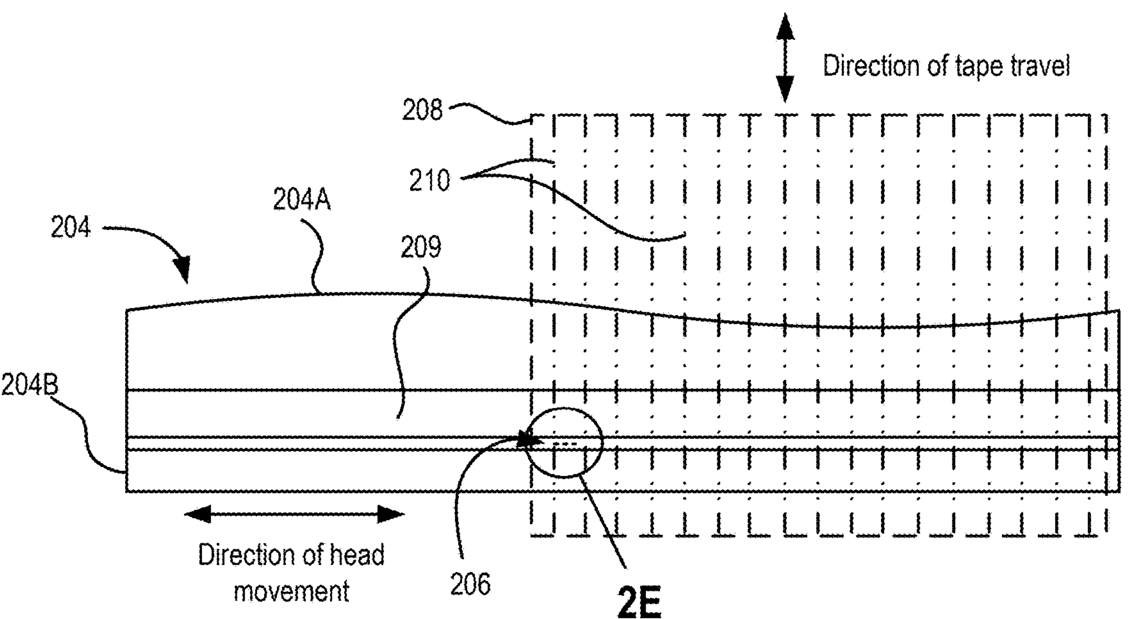
FIG. 2D is a tape bearing surface view taken from Line 2D of FIG. 2C.

FIG. 2D illustrates the tape bearing surface 209 of one of the modules 204 taken from Line 2D of FIG. 2C. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2D on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figures 2E, 2F:
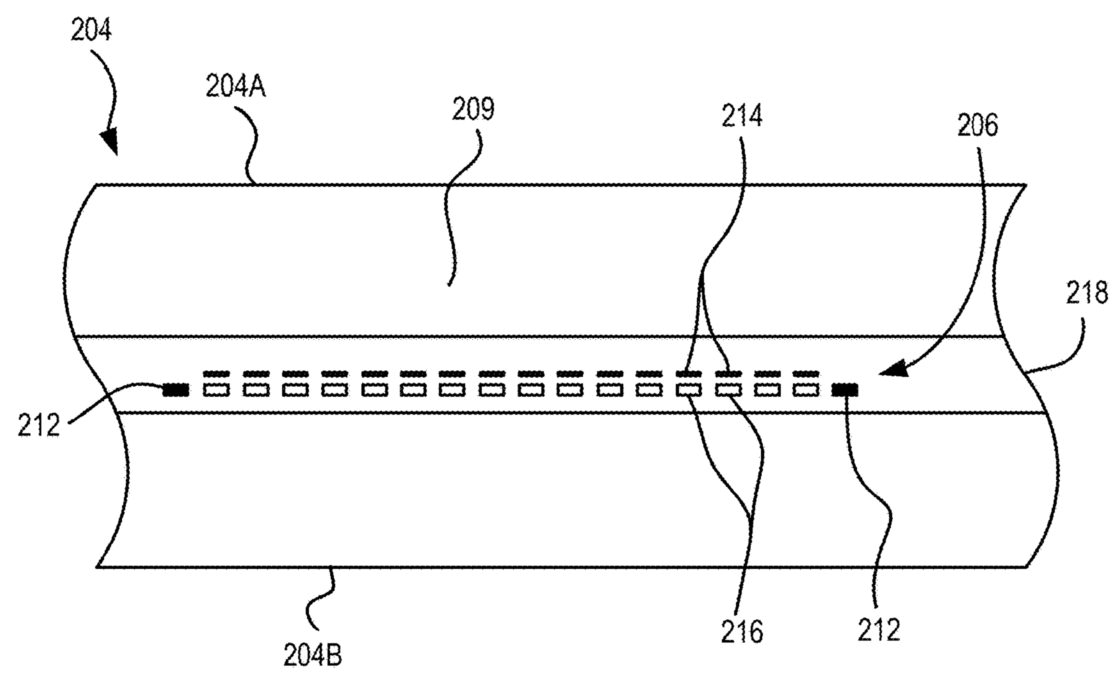
FIG. 2E is a detailed view taken from Circle 2E of FIG. 2D.
FIG. 2F is a detailed view of a partial tape bearing surface of a pair of modules.

FIG. 2E depicts a plurality of read transducers and/or write transducers 206 formed in a gap 218 on the module 204 in Circle 2E of FIG. 2D. As shown in FIG. 2E, the array of read transducers and write transducers 206 includes, for example, 16 write transducers 214, 16 read transducers 216 and two servo readers 212, though the number of elements may vary. Illustrative embodiments include 8, 16, 32, 40, and 64 active read transducers and/or write transducers 206 per array, and alternatively interleaved designs having odd numbers of read transducers or write transducers such as 17, 25, 33, etc. An illustrative embodiment includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2E, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2C and 2D-2E together, each module 204 may include a complementary set of read transducers and/or write transducers 206 for such things as bi-directional reading and writing, read-while-write capability, backward compatibility, etc.

FIG. 2F shows a partial tape bearing surface view of complementary modules of a magnetic tape head 211, according to one embodiment. In this embodiment, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 211 operate in a transducing relationship in the manner well-known in the art. The head assembly 211 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 211 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
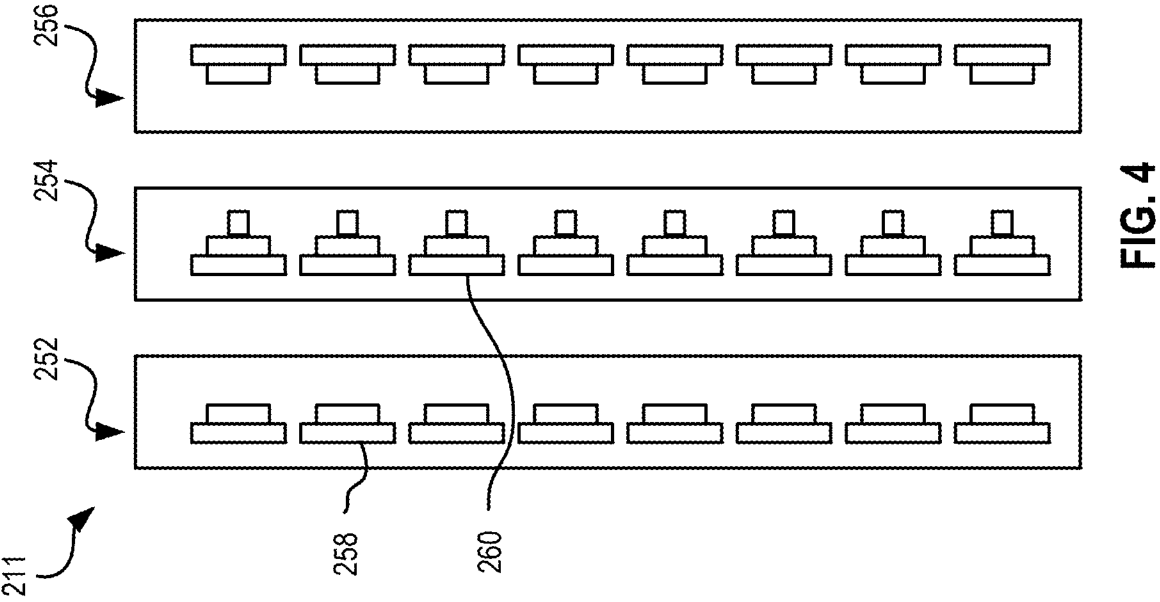
FIG. 4 is a partial tape bearing surface view of a magnetic head having a read-write-read configuration, in accordance with one embodiment.
Figure 3:
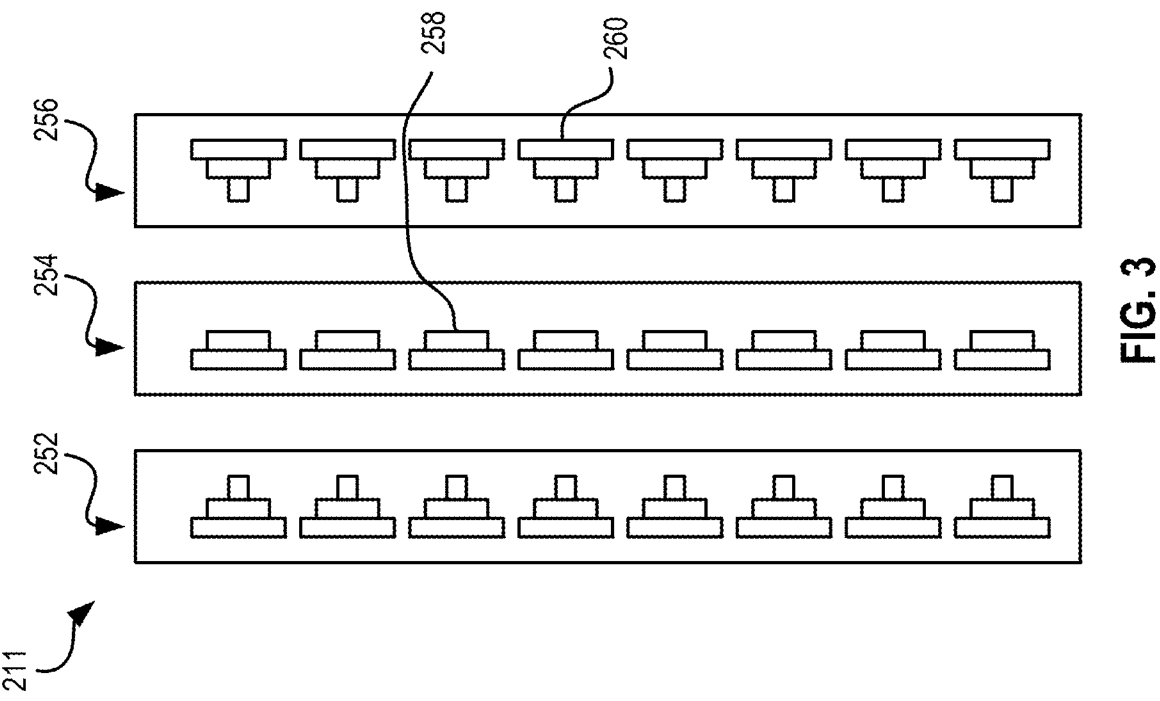
FIG. 3 is a partial tape bearing surface view of a magnetic head having a write-read-write configuration, in accordance with one embodiment.

The configuration of the tape head 211, according to one embodiment, includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
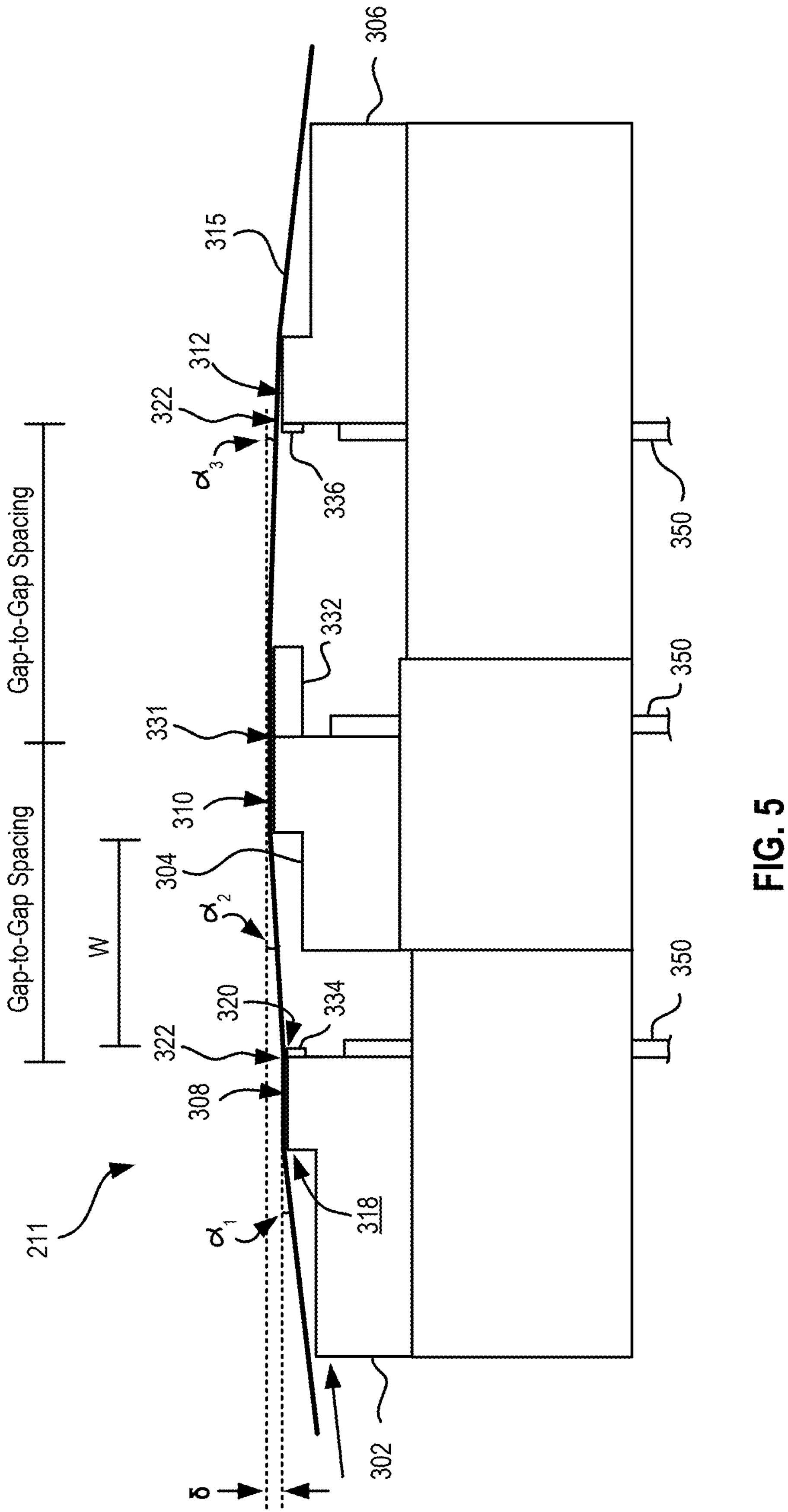
FIG. 5 is a side view of a magnetic tape head with three modules where the modules all generally lie along about parallel planes, in accordance with one embodiment.

FIG. 5 illustrates a magnetic tape head 211 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing." The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
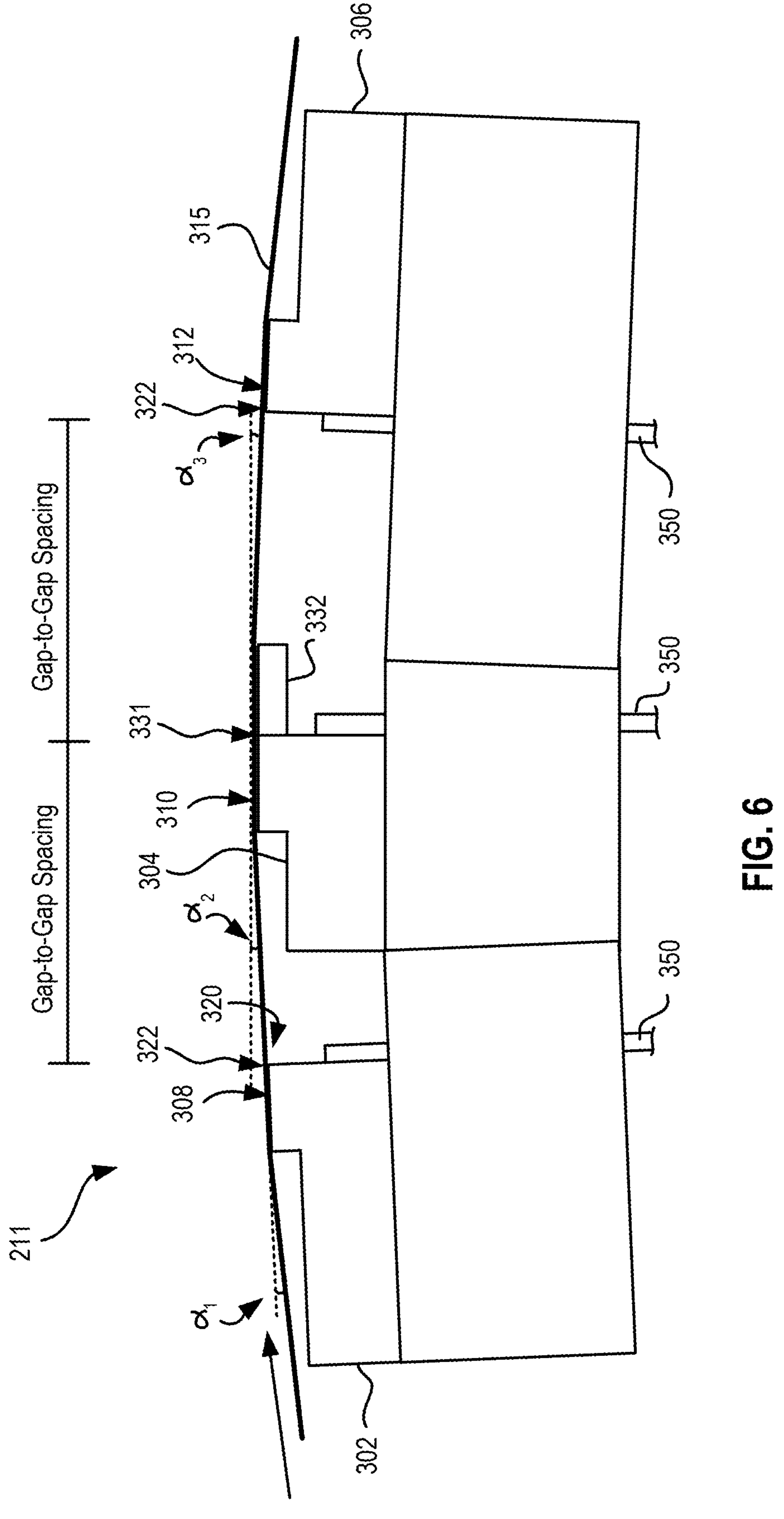
FIG. 6 is a side view of a magnetic tape head with three modules in a tangent (angled) configuration, in accordance with one embodiment.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, write transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the second module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no write transducers. The first and third modules 302, 306 include write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
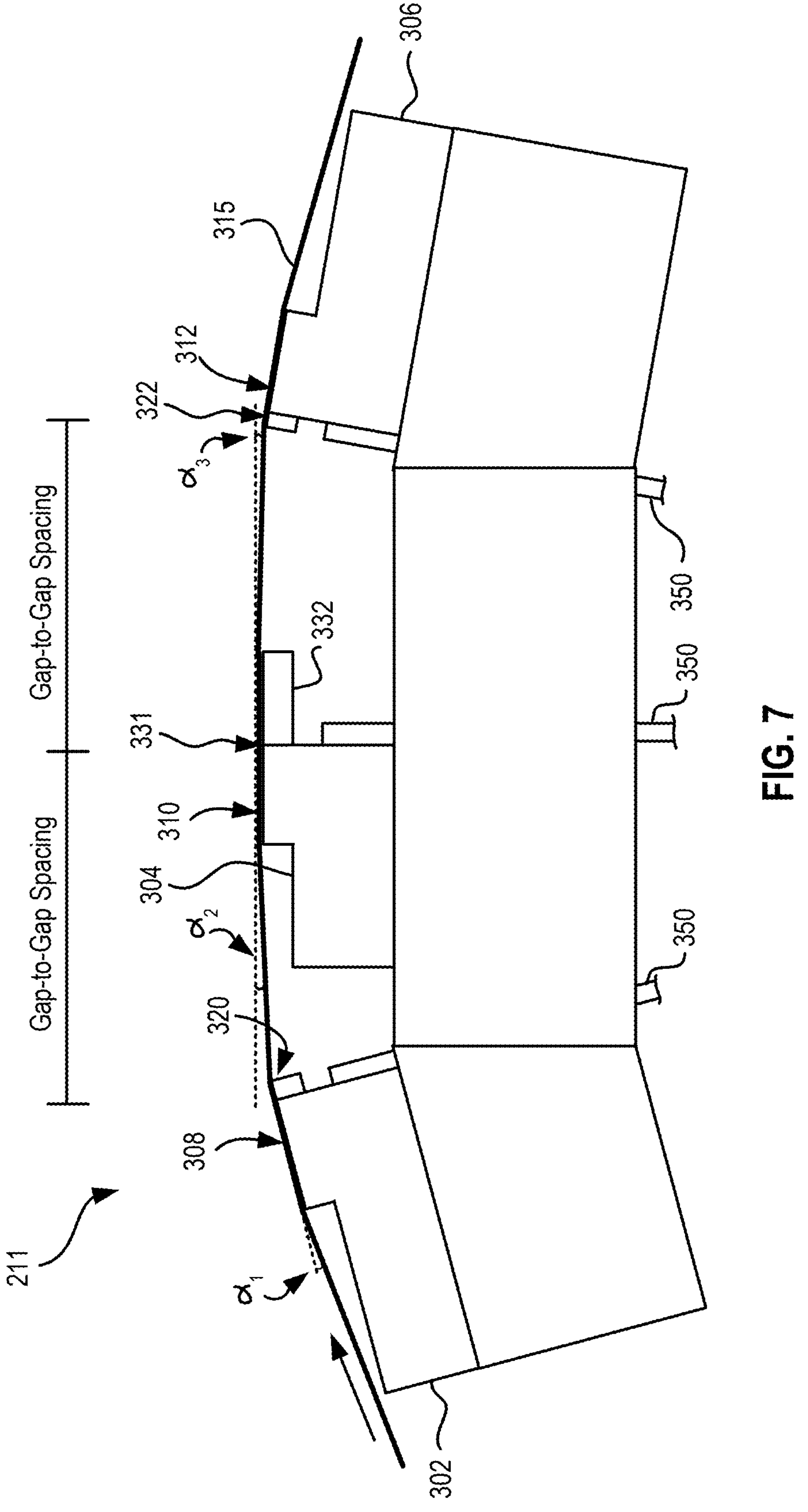
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 211 may use cables 350 having leads on the same or smaller pitch as current sixteen channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
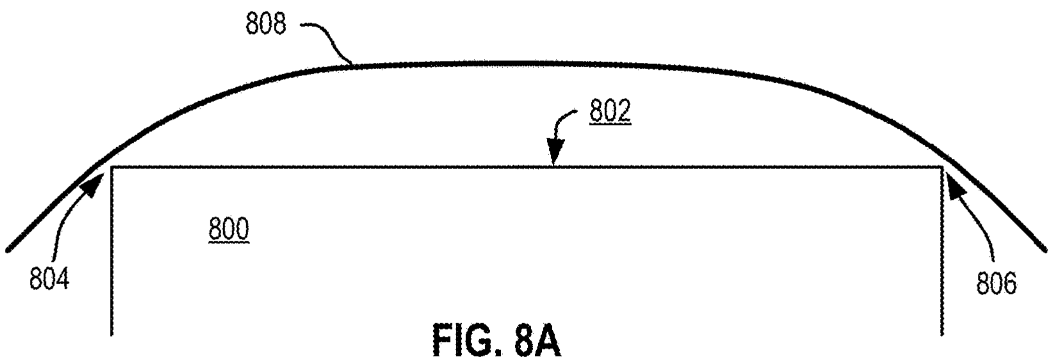
FIGS. 8A-8C are schematics depicting the principles of tape tenting.
Figure 8B:
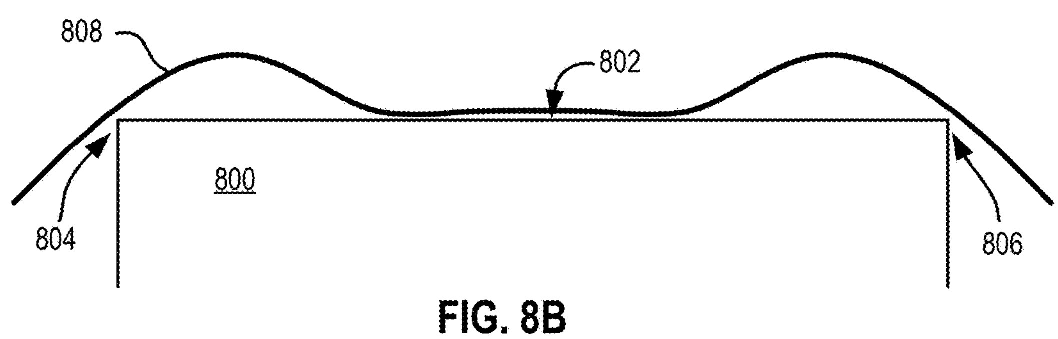
Figure 8C:
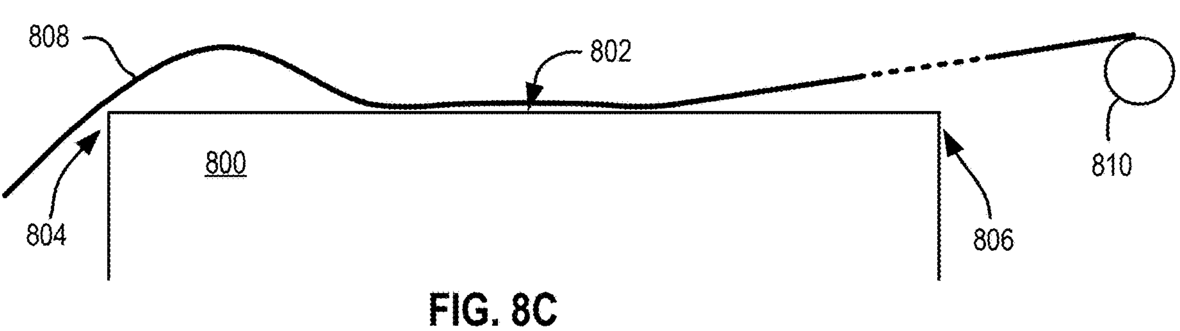

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enable access to compliant tapes. It should be appreciated that various embodiments herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the embodiments below may be described with reference to LTFS, which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 205 of FIG. 2A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
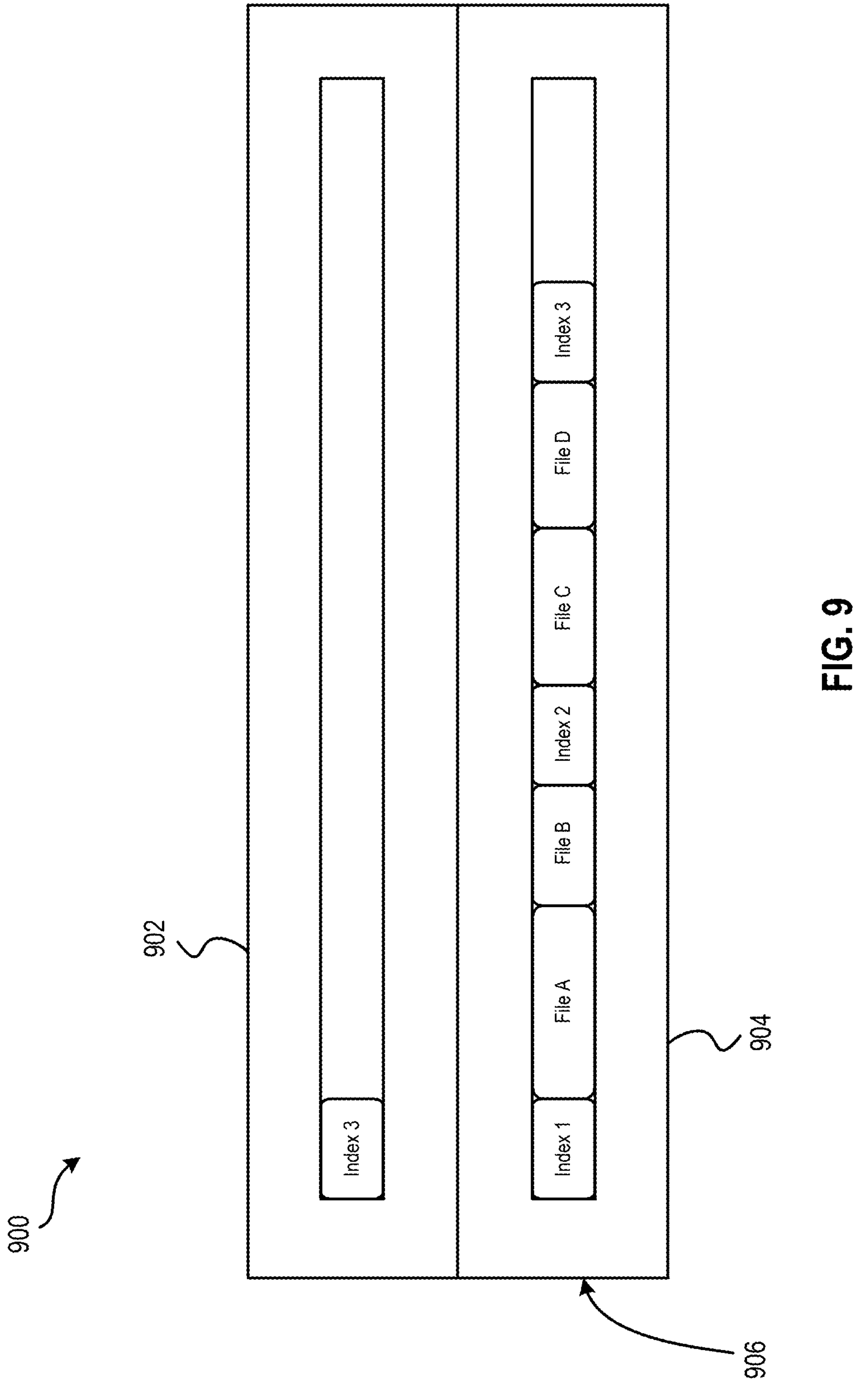
FIG. 9 is a representational diagram of files and indexes stored on a magnetic tape, in accordance with one embodiment.

Looking to FIG. 9, a magnetic tape 900 having an index partition 902 and a data partition 904 is illustrated, according to one embodiment. As shown, data files and indexes are stored on the tape. The data that makes up a data file is written to the data partition 904. The index file created in the index partition 902 and the data partition 904 stores file system meta information such as file names, locations on the data partition where the files are recorded, sizes, etc. This allows the data on the tape to be treated as a file on the file system. The LTFS format allows for index information to be recorded in the index partition 902 at the beginning of tape 906, thereby making it more readily accessible than the index information stored in the data partition 904.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three versions of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the magnetic tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As noted above with reference to FIG. 2D, a magnetic recording tape is typically divided into multiple data bands, each band having a number of data tracks in which data is recorded along the length direction of the tape.

Conceptually, a tape drive divides the width of the tape into multiple areas (wraps) and records data in the length direction of the tape from the beginning to the end of the tape and from the end to the beginning for each wrap. The area in the tape width direction where valid data for each wrap is written is called a data track.

Figure 10:
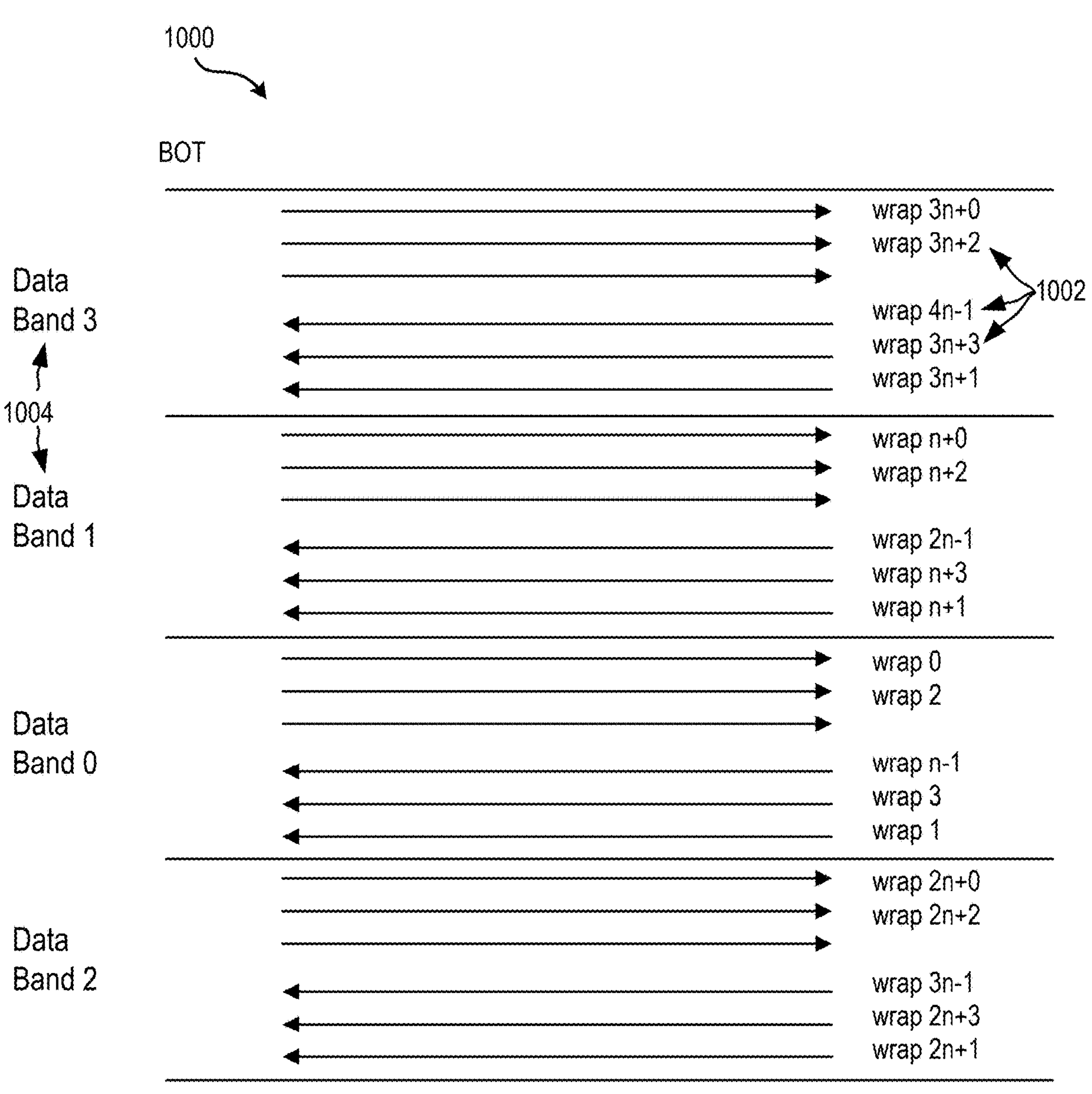
FIG. 10 is a conceptual diagram illustrating an exemplary general layout of wraps within data bands on a magnetic recording tape, in accordance with one embodiment.

FIG. 10 illustrates an exemplary general layout of wraps 1002 within data bands 1004 on a magnetic recording tape 1000, in accordance with one embodiment. As shown in FIG. 10, in even numbered wraps, recording is performed on the track while traveling from the beginning of tape (BOT) to the end of tape (forward direction). In odd numbered wraps, recording is performed while traveling from the end to the BOT (backward direction).

Read Offset Overview

As noted above, e.g., with reference to FIGS. 2E-4, one or more of the modules of a tape drive has servo readers and data readers (also referred to herein as read transducers). The relative positions of data readers vs. servo readers are such that, when the servo readers are positioned at a particular location within data servo patterns of the servo tracks on the magnetic tape, the data readers are therefore expected to be located at a corresponding location where a data track is prescribed to be on that same tape.

However, minor magnetic variations may occur in any individual data or servo reader element, slightly affecting its position relative to the other elements. If a data reader is slightly shifted, then only the position of that data reader relative to the corresponding data track is affected. If a servo reader is slightly shifted, then its relative position compared to every data reader is affected. This has the effect that when the servo system positions the servo reader over the servo pattern at a given location, all data readers will be slightly shifted from their ideal positions over data tracks. As track pitches decrease, small variations in the magnetic centerline of servo readers generate proportionally larger errors in track placement.

Figure 11:
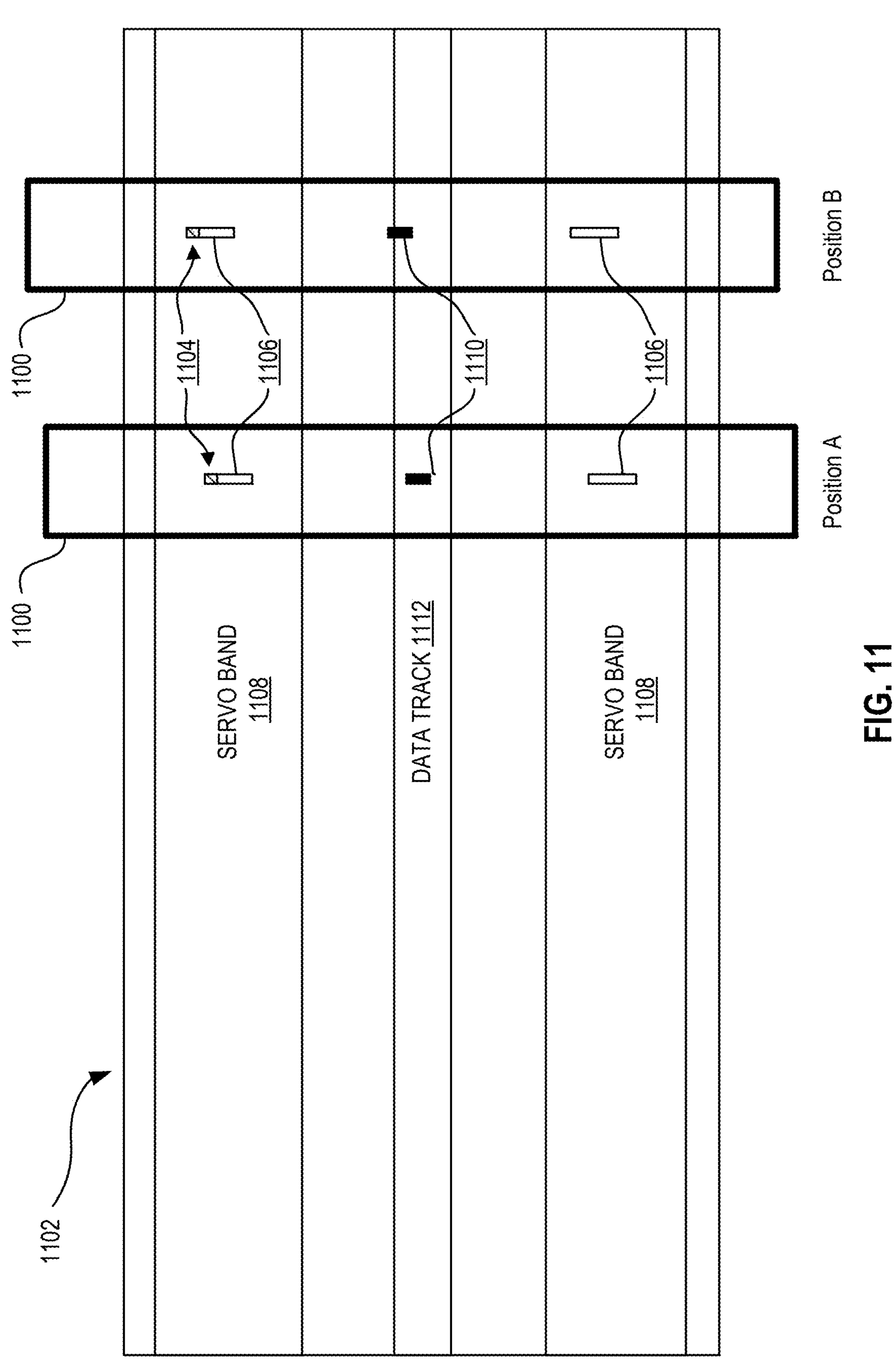
FIG. 11 is a graphical depiction of a reader module relative to a magnetic tape, where one of the servo readers is damaged.

FIG. 11 graphically illustrates a reader module 1100 relative to a magnetic tape 1102, where an end 1104 of one of the servo readers 1106 is damaged. As shown, the servo readers 1106 are centered on the respective servo bands 1108 at position A. However, because the upper servo reader of the servo readers 1106 has a damaged end 1104, the magnetic centerline between the servo readers 1106 no longer matches the physical centerline. Because the magnetic center of the upper servo reader of the servo readers 1106 is actually lower due to the damage, the servoing system believes the servo reader is lower on the upper servo band of the servo bands 1108. Accordingly, the reader module 1100 is shifted upward to position B by the servoing system to compensate. However, the data read transducer 1110 is now at a different location than it is supposed to be, and is off-center of the target data track 1112 thereunder. For example, if the damage to the top servo reader of the servo readers 1106 results in a shift of its magnetic center by 100 nm, when the information from both servo readers are averaged to determine the track following position, the read transducer 1110 will be 50 nm off from the proper position.

There has heretofore been no procedure to account for this variation for reader modules. Accordingly, the following description describes a methodology to measure the variation using data readers, where the measurement is made against a known reference so that all drives calibrated according to the teachings herein are able to optimally read tapes written by any drive. For example, the following disclosure describes a process to characterize this variation, and provide a measurement termed "read offset" herein, as well as the process to create and maintain a known reference against which the measurement is made.

In preferred embodiments, as each drive is manufactured, the head is calibrated against a pre-written 'reference tape' to measure and correct for any positioning variation required to read in the center of the nominal written track position. The results represent the read offset for each data reader, and are measured for both directions of tape operation (forward and reverse).

The calibration procedure involves measuring error rates at multiple positions centered around the nominal read position, and determining if a small offset is needed to center a particular reader within the associated data track. By using a common reference, every drive that undergoes this procedure is optimized to read at the same position.

Reference tapes are considered consumable, and are expected to sustain damage and/or wear over time. An original batch of reference tapes, referred to as "golden tapes," are preferably created and used infrequently as a basis to create fresh reference tapes.

In one exemplary process, a golden tape is created. Preferably multiple golden tapes are created using the same drive. The golden tapes are used to create reference tapes. Each manufactured drive uses reference tapes to calibrate optimal read offsets for the data readers of that particular drive. The resulting read offsets are stored in non-volatile drive memory and are applied during all future read operations.

Exemplary Calibration Process

Figure 12:
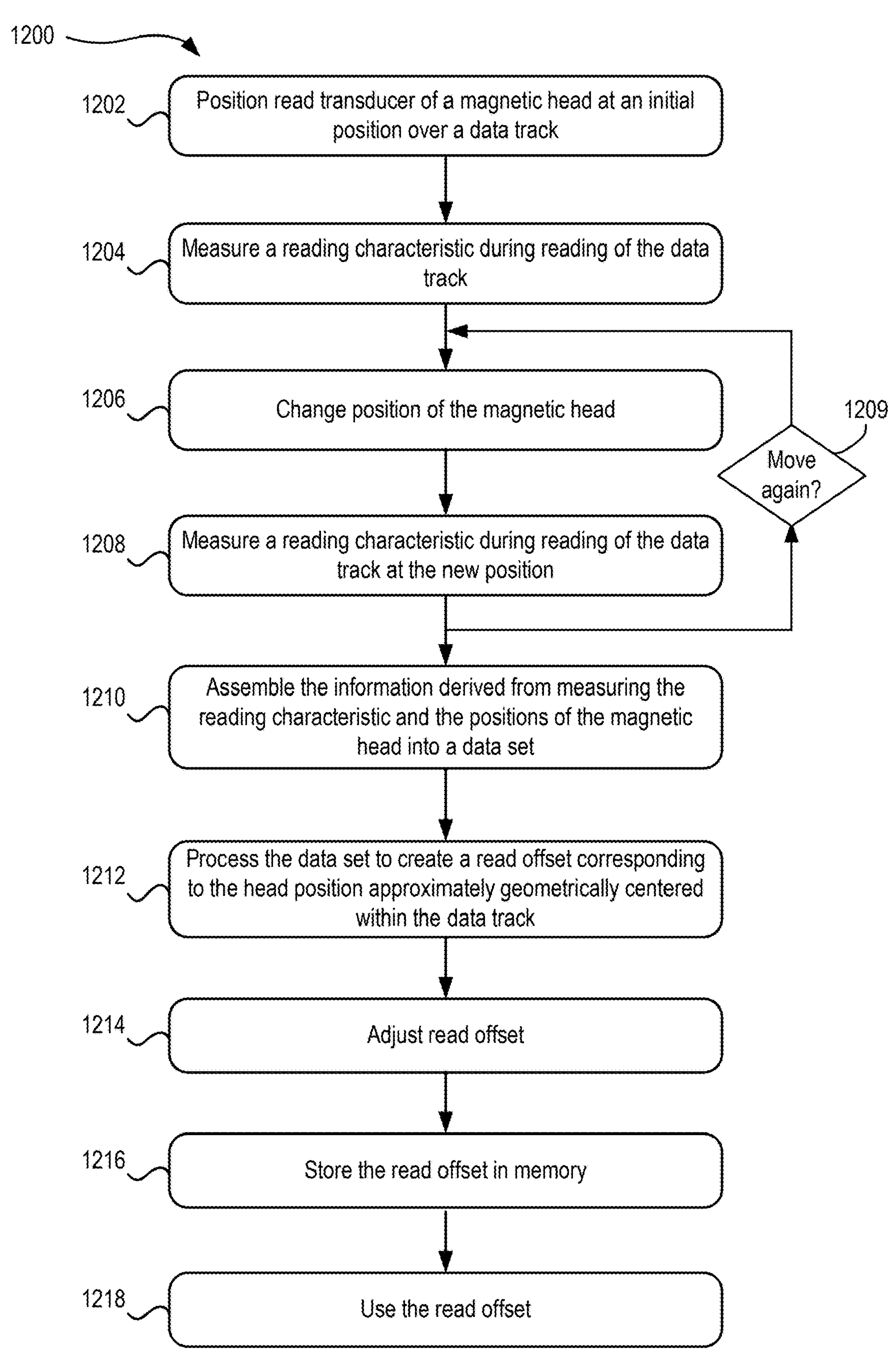
FIG. 12 is a flowchart of a method, in accordance with one embodiment.

Now referring to FIG. 12, a flowchart of a method 1200 is shown according to one embodiment. The method 1200 may be performed in accordance with the present invention in any of the environments depicted in FIGS. 1-11, among others, in various embodiments. Of course, more or fewer operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, method 1200 may initiate with operation 1202, where a read transducer of a magnetic head is positioned at an initial position over a data track on a magnetic recording tape using servo information derived from servo reader signals. The initial position may be a predefined position, a position that the drive believes to be center of track, etc.

The tape may be a pre-written reference tape (described below), a pre-written golden tape (described below; also referred to herein as a primary tape or primary magnetic recording tape), or some other pre-written magnetic recording tape that is compatible with the method 1200. For example, the magnetic recording tape may be a reference tape that was synchronized to a golden (primary) tape, e.g., to remove small positional variations due to measurement error. The data track may have any type of data pattern therein.

In operation 1204, a reading characteristic is measured during reading of the data track. Any reading characteristic that would become apparent to one skilled in the art after reading the present disclosure may be used. The reading characteristic is preferably something that the tape drive is already programmed to calculate. In preferred embodiments, the reading characteristic is a read error such as Mean Square Error (MSE). In other embodiments, the reading characteristic is a Signal to Noise Ratio (SNR), etc. Equivalently, the reading characteristic may be a value or values derived from a native, drive-produced reading characteristic.

In operation 1206, a position of the magnetic head is sequentially changed relative to the data track. For example, the head may be stepped laterally from the current position by a predetermined amount. Ideally, sequentially changing the position of the magnetic head includes applying positive and negative offsets from the initial position, whereby the head is shifted through a plurality of positions located on either side of the initial position.

In operation 1208, the reading characteristic is measured during reading of the data track at each new position after the position is changed. A decision 1209 may be made as to when enough cycles of movement and measuring have been completed based on any predefined criteria that would become apparent to one skilled in the art after reading the present disclosure.

In particularly preferred embodiments, the reading characteristic is measured for a plurality of read transducers reading multiple data tracks simultaneously, and the collective data is used in subsequent operations.

In operation 1210, the information derived from measuring the reading characteristic and the positions of the magnetic head are assembled into a data set of any type that would become apparent to one skilled in the art after reading the present disclosure. An exemplary data set may be a table.

Figure 13:
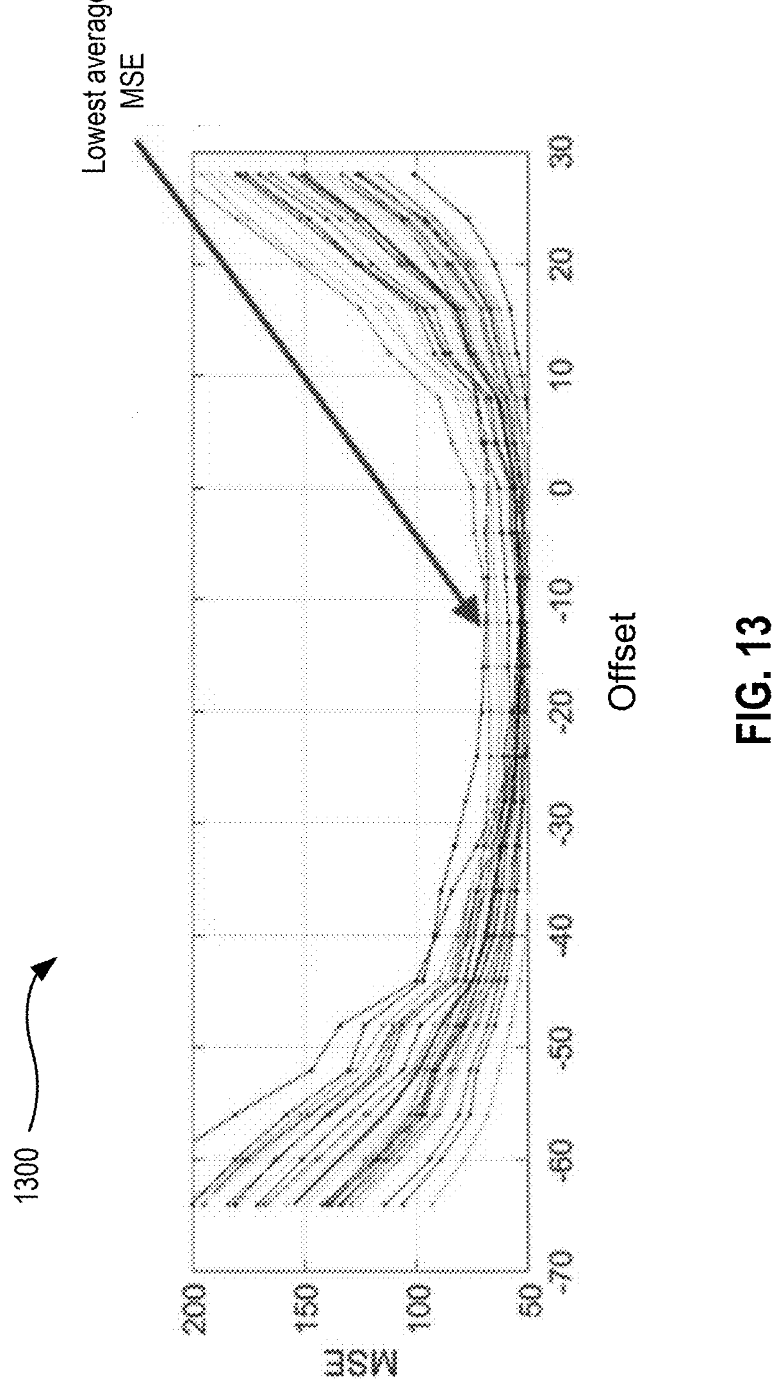
FIG. 13 is a graph of an exemplary data set, in accordance with one embodiment.

FIG. 13 illustrates an exemplary data set in the form of a graph 1300 of MSE readings at different offset values relative to the initial position at 0 offset.

In operation 1212 of FIG. 12, the data set is processed to create a read offset corresponding to the head position that is approximately geometrically centered within the pre-written track. This position may or may not correspond to the location having a best reading characteristic. Preferred embodiments strive to have safety margins of approximately equal distance above and below the reader during reading operations, such that the reader is not biased more closely to one edge of the track than the other.

In some approaches, the location having a best reading characteristic may be used to select the geometric center of the track. For example, the best reading characteristic could correspond to the location having the lowest reading error, the highest SNR, etc. In preferred embodiments, the read offset is based on an average of the reading characteristics from the plurality of read transducers. For example, as shown in FIG. 13, the center of the curve with the lowest MSE values is at an offset of about −12. This offset of −12 corresponds to the lowest average MSE value derived from the cumulative MSE values of all heads, which indicates that most of the readers were toward the center of the respective data tracks. Accordingly, the read offset can be based on a distance corresponding to the −12 offset derived from the data set.

Preferably, the read offset is adjusted using a value stored in a cartridge memory of the magnetic recording tape (or elsewhere), as described in further detail below. See operation 1214.

In operation 1216, the read offset is stored in a memory e.g., of the tape drive, of a host computer, etc.

Preferably, the method is performed for in both forward and reverse directions of travel of the magnetic recording tape. Thus, first read offset is determined for the forward direction, and a second read offset is determined for the reverse direction.

In operation 1218, the read offset is used to adjust a reading position when reading a second magnetic recording tape.

Figure 14:
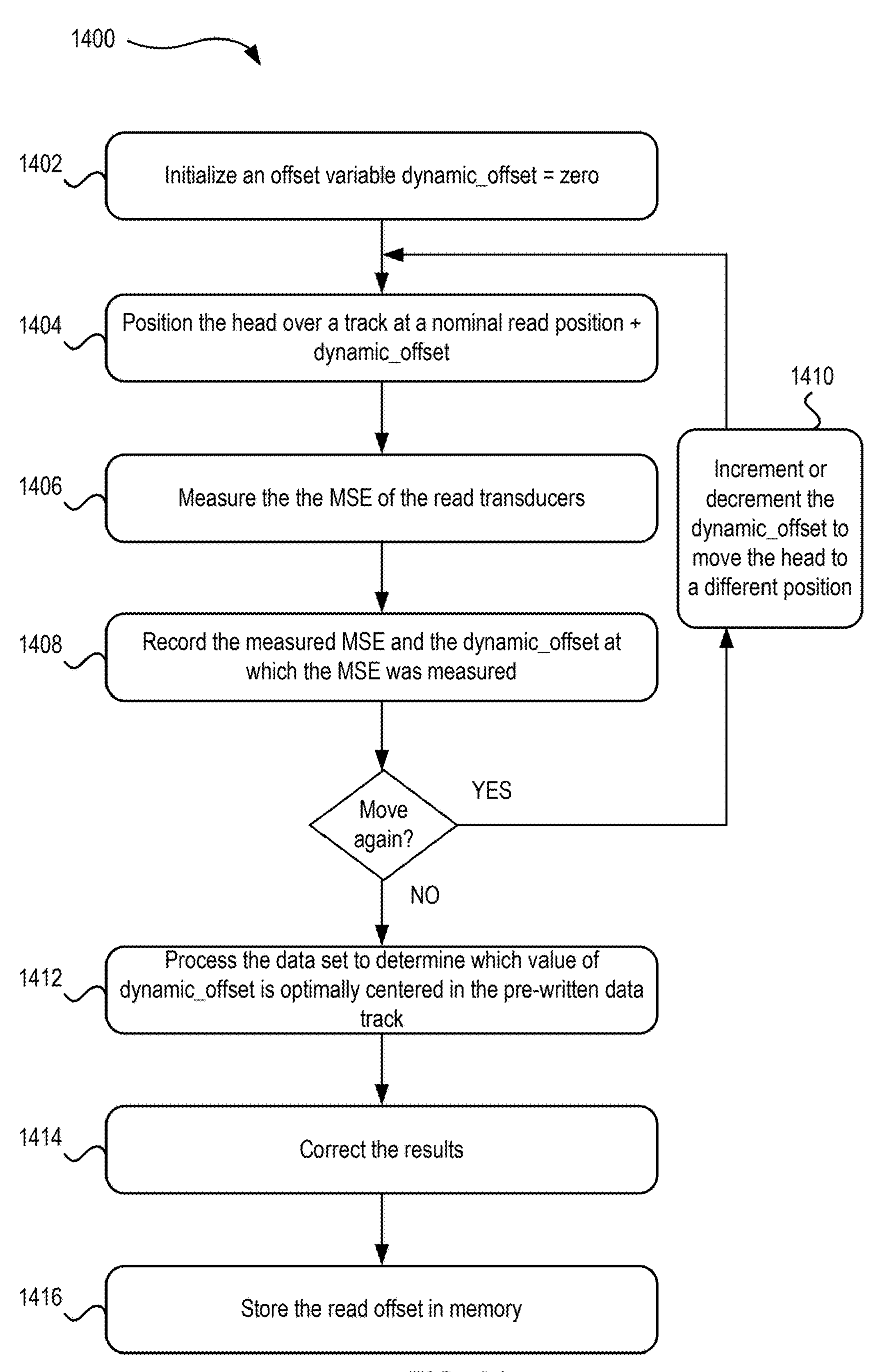
FIG. 14 is a flowchart of a method, in accordance with one embodiment.

Now referring to FIG. 14, a flowchart of an exemplary method 1400 is shown according to one embodiment. The method 1400 may be performed in accordance with the present invention in any of the environments depicted in FIGS. 1-13, among others, in various embodiments. Of course, more or fewer operations than those specifically described in FIG. 14 may be included in method 1400, as would be understood by one of skill in the art upon reading the present descriptions.

Each of the steps of the method 1400 may be performed by any suitable component of the operating environment. For example, in various embodiments, the method 1400 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 14, method 1400 may initiate with operation 1402, where an offset variable dynamic_offset=zero is initialized.

In operation 1404, the head is positioned over a track at a nominal read position+dynamic_offset.

In operation 1406, the MSE of the read transducers is measured.

In operation 1408, the measured MSE and the dynamic_offset at which the MSE was measured are recorded.

In operation 1410, the dynamic_offset is incremented or decremented to move the head to a different position.

Operations 1404-1410 are repeated at positive and negative values of dynamic_offset, encompassing a suitable range above and below the nominal offset. The information gathered is used to create a data set.

In operation 1412, the resulting data set is processed to determine which value of dynamic_offset is optimally centered in the pre-written data track.

Operations 1402-1412 are repeated for both the forward and reverse directions of tape travel.

In operation 1414, the results are corrected by any information stored in Cartridge Memory (CM) of the tape (described below), and/or elsewhere.

In operation 1416, the results are stored in the drive, and/or elsewhere.

After this procedure, the optimal read offsets may be preserved in non-volatile memory in the drive, to be applied for every future read operation performed by this drive, thus accounting for any drive-to-drive variation in positioning of the read head. Because all drives are measured against a common reference, interchange between drives is improved.

A tape drive apparatus, in accordance with various embodiments, may include a drive mechanism for passing a magnetic recording tape over a magnetic head, and a controller electrically coupled to the magnetic head, the controller being configured to perform the methodology presented above and/or below.

Golden Tapes

It may be desirable to generate "golden tapes" (primary magnetic recording tapes) that are only used to create new reference tapes in the future, because reference tapes become worn or damaged from use and so may need to be replaced. Preferably, the golden tapes are all written by the same tape drive. Preferably, the tape drive has characteristics very close to design specifications.

The golden tapes are ideally written, then compared to each other to confirm that they all yield the same read offset values for a given drive, such that they are deemed functionally identical.

Data may be stored in the Cartridge Memory (CM) of each golden tape, in a header section of the tape medium, in a database that stores information about the tape, etc. In one approach, the data identifies this tape as a golden tape. Also and/or alternatively, the data may include metadata about the tape (e.g. drive serial number that wrote it, date it was written, drive code version that wrote it, etc.).

In some embodiments, a golden tape may be used as a reference tape to calibrate production drives.

Preferably, the golden tapes are stored in controlled conditions to prevent changes such as tape lateral expansion or contraction due to humidity, temperature, etc.

Reference Tapes

Reference tapes are written by a known-good tape drive. Whether a drive is known-good is preferably evaluated with some human intervention, including choosing a drive that reads/writes well and the magnetic writers/readers appear close to the nominal dimensions and positions (i.e. its read offset and corresponding write offset values are near zero).

Data may be stored in the CM of each reference tape in a header section of the tape medium, in a database that stores information about the tape, etc. In one approach, the data identifies this tape as a reference tape. Also and/or alternatively, the data may include metadata about the tape (e.g. drive serial number that wrote it, date it was written, drive code version that wrote it, etc.).

After the reference tape is written, it is 'synchronized' to a golden tape to remove small positional variations due to measurement error.

Figure 15:
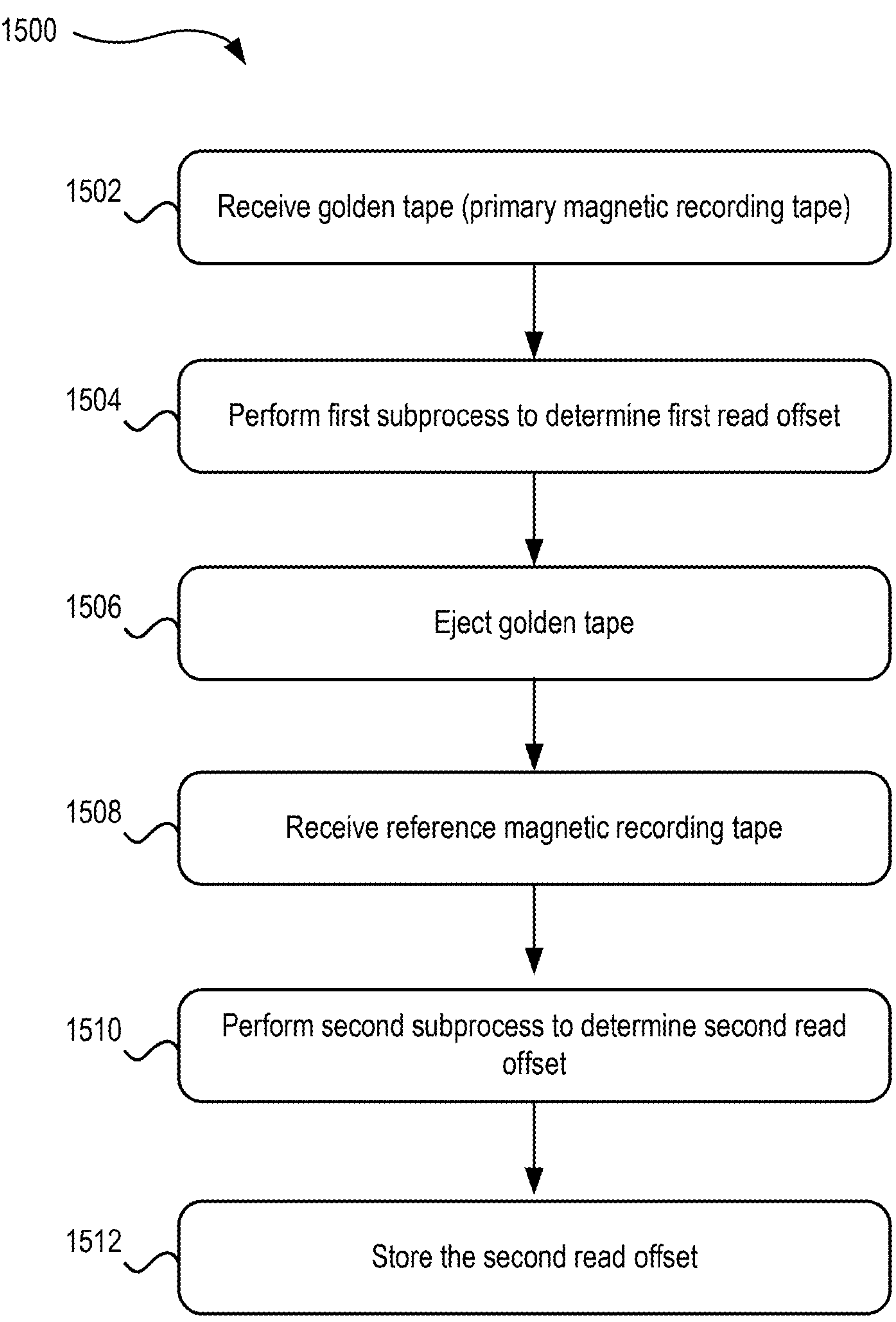
FIG. 15 is a flowchart of a method, in accordance with one embodiment.

Now referring to FIG. 15, a flowchart of a method 1500 for synchronizing a reference tape to a golden tape is shown according to one embodiment. The method 1500 may be performed in accordance with the present invention in any of the environments depicted in FIGS. 1-14, among others, in various embodiments. Of course, more or fewer operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a tape drive, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 15, method 1500 may initiate with operation 1502, where a golden tape (primary magnetic recording tape) is received by the drive. For example, the golden tape may be loaded into the drive.

In operation 1504, a first subprocess is performed using the golden tape, the first subprocess comprising operations from the methodology of FIGS. 12 and/or 14 to determine a first read offset corresponding to a final position approximately geometrically centered within the pre-written data track when reading the golden tape. Again, this may or may not correspond to the position having the best reading characteristic.

Note that after operation 1504, the measured first read offset is applied to the current drive.

In operation 1506, the golden tape is ejected.

In operation 1508, a reference magnetic recording tape is received in the tape drive, e.g., loaded.

In operation 1510, a second subprocess is performed using the reference magnetic recording tape, the second subprocess comprising operations from the methodology of FIGS. 12 and/or 14 to determine a second read offset corresponding to a final position approximately geometrically centered within the pre-written data track. Note that the second read offset measurement would ideally be a value of zero under perfect conditions. Any non-zero result is the magnetic difference between the golden tape and the new reference tape. Therefore, this result is stored (for both directions of tape travel, forward and reverse) in the CM of the new reference cartridge, and subtracted from all future read offset measurements taken with this cartridge. This is the mechanism by which correction for any final magnetic discrepancies between the new reference tape and the golden tapes can be made.

In operation 1512, the second read offset is stored in association with the reference magnetic recording tape, e.g., in a CM of the tape cartridge, in a header section of the magnetic tape media, etc. For example, the second read offset may be considered an expected measured offset, for use for all future read offset calibrations using this cartridge. A flag may be stored to indicate that the tape has been synchronized to a golden tape.

By using golden tapes and reference tapes, the original reference can be preserved over time and eliminate stacking errors created by making copies of copies of tapes over the entire time a line of tape drives is produced.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

positioning a read transducer of a magnetic head at an initial position over a data track on a magnetic recording tape using servo information derived from servo reader signals;

measuring a reading characteristic during reading of the data track;

sequentially changing a position of the magnetic head relative to the data track and measuring the reading characteristic during the reading of the data track at the sequentially changed positions;

assembling information derived from the measured reading characteristics and the sequentially changed positions of the magnetic head into a data set;

processing the data set to create a read offset corresponding to a final position approximately geometrically centered within the data track; and storing the read offset in a memory, wherein the method is performed for both forward and reverse directions of travel of the magnetic recording tape, wherein a first read offset of the read offset is determined for the forward direction, and a second read offset of the read offset is determined for the reverse direction.

2. The method of claim 1, wherein the reading characteristic is measured for a plurality of read transducers reading multiple data tracks simultaneously at the sequentially changed positions.

3. The method of claim 2, wherein the read offset is based on an average of the reading characteristics from the plurality of read transducers.

4. The method of claim 1, wherein the read offset is adjusted using a value stored in a cartridge memory of the magnetic recording tape.

5. The method of claim 1, comprising using the read offset to adjust a reading position when reading a second magnetic recording tape.

6. The method of claim 1, wherein the magnetic recording tape is a reference tape that was synchronized to a primary (golden) tape.

7. The method of claim 1, wherein sequentially changing the position of the magnetic head includes applying positive and negative offsets from the initial position.

8. A computer program product, comprising:

one or more computer-readable storage media; and program instructions stored on the one or more computer-readable storage media to perform operations comprising:

positioning a read transducer of a magnetic head at an initial position over a data track on a magnetic recording tape using servo information derived from servo reader signals;

measuring a reading characteristic during reading of the data track;

sequentially changing a position of the magnetic head relative to the data track and measuring the reading characteristic during the reading of the data track at the sequentially changed positions;

assembling information derived from the measured reading characteristics and the sequentially changed positions of the magnetic head into a data set;

processing the data set to create a read offset corresponding to a final position approximately geometrically centered within the data track; and storing the read offset in a memory, wherein the operations are performed for both forward and reverse directions of travel of the magnetic recording tape, wherein a first read offset of the read offset is determined for the forward direction, and a second read offset of the read offset is determined for the reverse direction.

9. The computer program product of claim 8, wherein the reading characteristic is measured for a plurality of read transducers reading multiple data tracks simultaneously at the sequentially changed positions.

10. The computer program product of claim 9, wherein the read offset is based on an average of the reading characteristics from the plurality of read transducers.

11. The computer program product of claim 8, wherein the read offset is adjusted using a value stored in a cartridge memory of the magnetic recording tape.

12. The computer program product of claim 8, wherein the operations further comprise using the read offset to adjust a reading position when reading a second magnetic recording tape.

13. The computer program product of claim 8, wherein the magnetic recording tape is a reference tape that was synchronized to a golden tape.

14. The computer program product of claim 8, wherein sequentially changing the position of the magnetic head includes applying positive and negative offsets from the initial position.

15. A method for creating a reference tape, the method comprising:

receiving a primary magnetic recording tape;

performing a first subprocess using the primary magnetic recording tape, the first subprocess comprising:

positioning a read transducer of a magnetic head at an initial position over a data track on the primary magnetic recording tape using first servo information derived from servo reader signals, measuring a reading characteristic during reading of the data track, sequentially changing a position of the magnetic head relative to the data track and measuring the reading characteristic during the reading of the data track at the changed positions, assembling information derived from the measured reading characteristics and the changed positions of the magnetic head into a data set, and processing the data set to determine a first read offset corresponding to a position approximately geometrically centered within the data track;

ejecting the primary magnetic recording tape;

receiving a reference magnetic recording tape;

performing a second subprocess using the reference magnetic recording tape, the second subprocess comprising:

applying the first read offset;

positioning the read transducer of the magnetic head at a second initial position over a second data track on the reference magnetic recording tape using second servo information derived from servo reader signals, measuring a second reading characteristic during reading of the second data track of the reference magnetic recording tape with the first read offset applied, sequentially changing the position of the magnetic head relative to the second data track of the reference magnetic recording tape and measuring the second reading characteristic during the reading of the second data track at the changed positions, assembling second information derived from the measured second reading characteristics and the changed positions of the magnetic head into a second data set, and processing the second data set to determine a second read offset corresponding to a final position approximately geometrically centered within the second data track; and storing the second read offset in a memory of the reference magnetic recording tape.

16. The method of claim 15, further comprising using the reference magnetic recording tape to calibrate a tape drive for generating a third read offset.

17. The method of claim 16, wherein the second read offset is used to adjust a value of the third read offset.

18. The method of claim 15, wherein sequentially changing the position of the magnetic head relative to the data track of the primary magnetic recording tape includes applying positive and negative offsets from the initial position.

* * * * *